(12) United States Patent
Sohn et al.

(10) Patent No.: US 10,138,371 B2
(45) Date of Patent: Nov. 27, 2018

(54) RESIN COMPOSITION FOR FORMING STEERING WHEEL REMOTE CONTROL BEZEL

(71) Applicants: SK Chemicals Co., Ltd., Suwon, Gyeonggi-Do (KR); Hyundai Motor Company, Seoul (KR); Kia Motors Corporation, Seoul (KR)

(72) Inventors: Dong-Cheol Sohn, Gyeonggi-Do (KR); Jong Ryang Kim, Gyeonggi-Do (KR); Tae-Woong Lee, Gyeonggi-Do (KR); Jong-Wook Shin, Gyeonggi-Do (KR); Han Ki Lee, Geyonggi-do (KR); Kyeong Hoon Jang, Seoul (KR); Dae Sik Kim, Seoul (KR); Myoung Ryoul Lee, Gyeonggi-Do (KR); Hak Soo Kim, Gyeonggi-Do (KR); Jung Gyun Noh, Gyeonggi-Do (KR)

(73) Assignees: SK Chemicals Co., Ltd., Suwon, Gyeonggi-do (KR); Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/116,982

(22) PCT Filed: Feb. 6, 2015

(86) PCT No.: PCT/KR2015/001252
§ 371 (c)(1),
(2) Date: Aug. 5, 2016

(87) PCT Pub. No.: WO2015/119460
PCT Pub. Date: Aug. 13, 2015

(65) Prior Publication Data
US 2016/0347950 A1    Dec. 1, 2016

(30) Foreign Application Priority Data

Feb. 7, 2014  (KR) .................. 10-2014-0014377

(51) Int. Cl.
| | |
|---|---|
| *C08L 69/00* | (2006.01) |
| *C08L 53/02* | (2006.01) |
| *C08L 55/02* | (2006.01) |
| *C08L 67/02* | (2006.01) |
| *C08K 3/014* | (2018.01) |

(52) U.S. Cl.
CPC .............. *C08L 69/00* (2013.01); *C08K 3/014* (2018.01); *C08L 53/02* (2013.01); *C08L 55/02* (2013.01); *C08L 67/02* (2013.01); *C08L 2201/08* (2013.01); *C08L 2205/03* (2013.01); *C08L 2205/035* (2013.01); *C08L 2205/08* (2013.01); *C08L 2207/53* (2013.01)

(58) Field of Classification Search
CPC .......... C08L 69/00; C08L 55/02; C08L 53/02; C08L 67/02; C08L 2205/03; C08L 2205/08; C08L 2205/035; C08L 2201/08; C08L 2207/53
See application file for complete search history.

(56) References Cited

U.S. PATENT DOCUMENTS

| | | | | |
|---|---|---|---|---|
| 4,713,415 A | * | 12/1987 | Lavengood | ............. C08L 25/12 525/183 |
| 5,371,142 A | * | 12/1994 | Nishikubo | .............. C08L 51/06 525/148 |
| 5,910,538 A | * | 6/1999 | Padwa | .................... C08L 51/04 525/67 |
| 6,025,061 A | * | 2/2000 | Khanarian | ........... C08G 63/668 428/221 |
| 6,150,621 A | * | 11/2000 | Nishitani | ............. B60Q 1/0082 200/345 |
| 7,119,152 B1 | | 10/2006 | Lacroix et al. | |
| 8,071,694 B2 | | 12/2011 | Yu et al. | |
| 2008/0246181 A1 | | 10/2008 | Zhu et al. | |

(Continued)

FOREIGN PATENT DOCUMENTS

| | | |
|---|---|---|
| CN | 1298346 A | 6/2001 |
| CN | 1298426 A | 6/2001 |

(Continued)

OTHER PUBLICATIONS

Brunelle, D.J.; Encyclopedia of Polymer Science and Technology: Polycarbonates, 2006, p. 1-33.*
Search Report and Written Opinion in corresponding PCT/KR2015/001252 dated Feb. 6, 2015.
J.S. Park et al., "Study on Morphology, Thermal Properties and Miscibility of Isosorbide Based PET/polycarbonate Blends", Applied Chemistry, 17(1), pp. 5-8 (May 2013).
Extended European Search Report for European Patent Application No. 15746056.9, dated Jul. 18, 2017, 7 pages.

*Primary Examiner* — Robert S Jones
(74) *Attorney, Agent, or Firm* — Mintz Levin Cohn Ferris Glovsky and Popeo, P.C.; Peter F. Corless

(57) ABSTRACT

Disclosed is a resin composition for forming a steering wheel remote control bezel. The resin composition comprises: an amount of about 40 to 50 wt % of a polyester copolymer including a dicarboxylic acid component residue including terephthalic acid and a diol component residue including dianhydrohexitol; an amount of about 10 to 20 wt % of at least one copolymer selected from a group consisting of unsaturated nitrile-diene-based rubber-aromatic vinyl grafted copolymers and alkylmethacrylate-diene-based rubber-aromatic vinyl grafted copolymers; and an amount of about 40 to 50 wt % of polycarbonate. Further, an amount of 0.1 to 0.5 parts by weight of a phosphate base antioxidant-based on 100 parts by weight of the resin composition is further added to the resin composition.

16 Claims, No Drawings

(56) References Cited

U.S. PATENT DOCUMENTS

| | | | | |
|---|---|---|---|---|
| 2009/0209695 A1* | 8/2009 | Yu | ............................ | C08L 67/02 |
| | | | | 524/451 |
| 2009/0286062 A1* | 11/2009 | Vaze | ........................ | C08L 67/02 |
| | | | | 428/220 |
| 2010/0222476 A1* | 9/2010 | Avakian | ................... | C08L 67/02 |
| | | | | 524/133 |
| 2011/0071235 A1 | 3/2011 | Kannan et al. | | |
| 2012/0271004 A1* | 10/2012 | Quinebeche | ........... | B29C 47/385 |
| | | | | 525/190 |

FOREIGN PATENT DOCUMENTS

| | | |
|---|---|---|
| CN | 105377984 A | 3/2016 |
| CN | 105377985 A | 3/2016 |
| JP | 08-127711 | 5/1996 |
| JP | 08-231841 A | 9/1996 |
| KR | 1995-0003307 | 4/2003 |
| KR | 10-2006-0007447 | 12/2005 |
| KR | 10-2013-0044867 | 5/2013 |
| KR | 10-2013-0055207 | 5/2013 |
| WO | 2013/062286 A1 | 5/2013 |
| WO | 2013/073819 A1 | 5/2013 |

\* cited by examiner

RESIN COMPOSITION FOR FORMING STEERING WHEEL REMOTE CONTROL BEZEL

This application is a National Phase application filed under 35 U.S.C. § 371 of PCT International Application No. PCT/KR2015/001252 with an International Filing Date of Feb. 6, 2015, which claims under 35 U.S.C. § 119(a) the benefit of Korean Patent Application No. 10-2014-0014377, filed Feb. 7, 2014, the entire contents of which are incorporated herein by reference.

TECHNICAL FIELD

The present invention relates to a resin composition for forming a steering wheel remote control bezel. In particular, the resin composition for forming a steering wheel remote control bezel may substantially improve environmental stress crack resistance such that chemical stress cracks may not be generated although a polyurethane foam contacts the resin during assembling a vehicle steering wheel remote control bezel. Further, the resin composition may provide improved heat resistance or impact resistance.

BACKGROUND

Recently, the vehicle industry has focused on using a chemical material in consideration of energy conservation and eco-friendly characteristics. For example, it may become an issue in the vehicle industry field that various chemical materials having luxurious texture and appearance with an inexpensive material may be used while decreasing a weight of a vehicle body.

Among chemical materials used as a vehicle interior material according to the related art, polypropylene has a structure in which a methyl group is bonded to every other carbon of a polyethylene molecule chain and a short branch is regularly bonded thereto. The polypropylene may be widely utilized due to excellent formability and an economical cost. For example, the specific gravity of polypropylene is about 0.92, such that polypropylene may be one of the lightest plastic materials among currently used plastics, and the melting point thereof is in a range of about 135 to 160° C., such that an application range of polypropylene may be various. However, polypropylene has disadvantages. The polypropylene may not be colored easily and it may be vulnerable to heat or light. In general, this polypropylene (PP) is applied in various components as a mainly used material among the vehicle interior materials. Recently, applications of a modified PP in order to overcome the above mentioned disadvantage have increased. Although difference may exist depending on the kind of vehicles, the polypropylene has been mainly applied to a center panel, a nozzle assembly, a map pocket, a panel assembly upper trim, a decoration, and the like.

In addition, among the vehicle interior materials, polyethylene as of thermosetting plastic material is a thin and flexible material having a feeling of wax, and a polyethylene material such as high-density polyethylene has been used in a duct assembly, a hose, assembly, a hose side, a door, and the like.

In addition, acrylonitrile-butadiene-styrene (ABS) may be easily processed and have substantial impact resistance and heat resistance, such that acrylonitrile-butadiene-styrene has been commercially used in components such as a pull HDL, a door trim, a decoration, a front panel trim, and the like, as the vehicle interior material.

Meanwhile, a polycarbonate/acrylonitrile-butadiene-styrene blend resin (hereinafter referred to as "PC/ABS") is a mixture resin obtained to provide processability, low-temperature impact resistance, plating efficiency, and the like from acrylonitrile-butadiene-styrene, and excellent mechanical properties, heat resistance (heat deflection temperature), electrical properties, dimensional stability, and the like from polycarbonate. The PC/ABS has been prominent as a material capable of being used in various uses from a functional component of a vehicle, and electrical/electronic products to an exterior material, and may be applied to a core part of components such as a cluster upper core, a crash pad upper, a center panel, and the like, and a small painted component among vehicle components.

Moreover, in general, polyethylene terephthalate as of thermoplastics has been used for a plastic drink bottles, but polyethylene terephthalate has been mainly used in a nonwoven fabric form in a package tray as the vehicle component and also utilized as a skin material of a cluster component.

In addition, for a product utilized as the vehicle interior component, other materials such as polyurethane, thermoplastic olefin, polyvinyl chloride, wood stock, wood paper, and the like have been used.

Meanwhile, a PC/ABS resin has been used in various fields such as various vehicle interior/exterior materials, building materials, for an appearance of electronic products, package materials, cases, boxes, interior/exterior materials, and the like, due to excellent properties such as impact resistance, heat resistance, rigidity, and the like. This PC/ABS resin inevitably contacts a polyurethane foam filled in a steering wheel remote control bezel when the steering wheel remote control bezel is assembled. However, the PC/ABS resin has serious problems that, at the time of contacting a polyurethane foam, an aromatic, or the like used in a vehicle, the color or an appearance of a PC/ABS molded product may be changed or a chemical crack may occur therein, thereby causing deterioration of product quality. In addition, at the time of using the PC/ABS resin as the vehicle interior material, the PC/ABS resin may have a latent problem directly associated with safety of a driver.

Therefore, a research into a resin composition that may provide environmental stress crack resistance, and improved heat resistance or impact resistance for forming a steering wheel remote control bezel has been required.

SUMMARY OF THE INVENTION

In a preferred aspect, the present invention provides a resin composition. The resin composition may provide a synthetic resin having substantially improved environmental stress crack resistance, such that chemical cracks may not be generated when a polyurethane foam that is used as a vehicle interior material contacts the resin at the time of assembling a steering wheel remote control bezel. The resin composition may further provide improved heat resistance or impact resistance that may be required in order to be applied as a vehicle interior material.

An exemplary embodiment of the present invention provides a resin composition for forming a steering wheel remote control bezel. The resin composition may include: an amount of about 40 to 50 wt % of a polyester copolymer including a dicarboxylic acid component residue including terephthalic acid and a diol component residue including dianhydrohexitol, based on the total weight of the resin composition; an amount of about 10 to 20 wt % of at least one copolymer selected from a group consisting of unsaturated nitrile-diene-based rubber-aromatic vinyl grafted copolymers and alkylmethacrylate-diene-based rubber-aromatic vinyl grafted copolymers, based on the total weight of the resin composition; and an amount of about 40 to 50 wt % of polycarbonate, based on the total weight of the resin composition. The resin composition may be further added with an amount of about 0.1 to 0.5 parts by weight of a phosphate-based antioxidant based on 100 parts by weight of the resin composition.

Also provided is a resin composition that consists of or consist essentially of the components as described above. For instance, the resin composition may consist of or consist essentially of: an amount of about 40 to 50 wt % of a polyester copolymer including a dicarboxylic acid component residue including terephthalic acid and a diol component residue including dianhydrohexitol, based on the total weight of the resin composition; an amount of about 10 to 20 wt % of at least one copolymer selected from a group consisting of unsaturated nitrile-diene-based rubber-aromatic vinyl grafted copolymers and alkylmethacrylate-diene-based rubber-aromatic vinyl grafted copolymers, based on the total weight of the resin composition; and an amount of about 40 to 50 wt % of polycarbonate, based on the total weight of the resin composition. Such resin may also be further added with an amount of about 0.1 to 0.5 parts by weight of a phosphate-based antioxidant based on 100 parts by weight of the resin composition.

The polyester copolymer may have a weight average molecular weight of about 50,000 to 60,000 and a glass transition temperature of about 105 to 125° C.

The dicarboxylic acid component in the polyester copolymer may further include at least one selected from a group consisting of aromatic dicarboxylic acids having 8 to 20 carbon atoms and aliphatic dicarboxylic acids having 4 to 20 carbon atoms.

The dianhydrohexitol in the polyester copolymer may be isosorbide.

A content of dianhydrohexitol in the polyester copolymer may be of about 5 to 60 mol % based on a content of the entire diol component.

In the polyester copolymer, the diol component may further include at least one selected from a group consisting of compounds represented by the following Chemical Formulas 1 to 3.

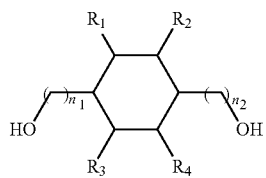

[Chemical Formula 1]

Here, $R_1$ to $R_4$ are each independently hydrogen or a substituted or unsubstituted alkyl group having 1 to 5 carbon atoms, and $n_1$ and $n_2$ are each independently integers of 0 to 3.

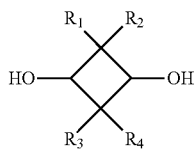

[Chemical Formula 2]

Here, $R_1$ to $R_4$ are each independently hydrogen or a substituted or unsubstituted alkyl group having 1 to 5 carbon atoms.

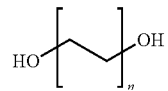

[Chemical Formula 3]

Here, n is an integer of 1 to 7.

In the polyester copolymer, the diol component may further include 1,4-cyclohexanediol and ethylene glycol.

The unsaturated nitrile-diene-based rubber-aromatic vinyl grafted copolymer may have a core-shell rubber form, an average particle diameter of about 0.1 to 0.4 μm, a degree of grafteding of about 5 to 90%, and the core has a glass transition temperature of about −20° C. or less, and the shell has a glass transition temperature of about 20° C. or greater.

In the unsaturated nitrile-diene-based rubber-aromatic vinyl grafted copolymer, the unsaturated nitrile may be at least one selected from a group consisting of acrylonitrile, methacrylonitrile, ethacrylonitrile, phenylacrylonitrile, and α-chloroacrylonitrile.

In the grafted copolymer, the diene-based rubber may be a butadiene type of rubber or an isoprene of type rubber.

In the grafted copolymer, the aromatic vinyl may be at least one selected from a group consisting of styrene, α-methylstyrenevinyltoluene, t-butylstyrene, halogen-substituted styrene, 1,3-dimethylstyrene, 2,4-dimethylstyrene, and ethylstyrene.

The alkylmethacrylate-diene-based rubber-aromatic vinyl grafted copolymer may be a methylmethacrylate-butadiene-styrene grafted copolymer.

The polycarbonate may have a glass transition temperature of about 130 to 160° C. and a weight average molecular weight of about 20,000 to 60,000.

The resin composition for forming a steering wheel remote control bezel may further include at least one selected from a group consisting of unsaturated nitrile-aromatic vinyl-glycidyl methacrylate-based compatibilizers and unsaturated nitrile-aromatic vinyl-maleic anhydride-based compatibilizers.

The phosphate-based antioxidant may be represented by the following Chemical Formula 4.

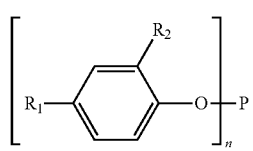

[Chemical Formula 4]

In Chemical Formula 4, $R_1$ and $R_2$ are each independently a substituted or unsubstituted alkyl group having 1 to 40 carbon atoms or a substituted or unsubstituted aryl group having 6 to 40 carbon atoms, and n is an integer of 1 or greater.

The resin composition for forming a steering wheel remote control bezel may further include at least one additive selected from a group consisting of a lubricant and an anti-hydrolysis agent.

According to various exemplary embodiments of the present invention, the resin composition for forming a steering wheel remote control bezel may provide an eco-friendly synthetic resin having excellent environmental stress crack resistance such that chemical cracks may not be generated when a polyurethane foam that is used as the vehicle interior material contacts the resin during assembly of the steering wheel remote control bezel. Further, the resin composition may have heat resistance or impact resistance suitable for the vehicle interior material.

Further provided is a steering wheel remote control bezel for a vehicle. The steering wheel remote control bezel may be manufactured from the resin composition as described herein.

Other aspects of the invention are disclosed infra.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention may be variously modified and have various exemplary embodiments, and specific embodiments of the present invention will be described in detail. However, the present invention is not limited to the exemplary embodiments described herein, but all of the modifications, equivalents, and substitutions within the spirit and scope of the present invention are also included in the present invention. Further, when it is determined that the detailed description of the known art related to the present invention may obscure the gist of the present invention, the detailed description thereof will be omitted.

The present invention provides a resin composition for forming a steering wheel remote control bezel. The resin composition may include: an amount of about 40 to 50 wt % of a polyester copolymer including a dicarboxylic acid component residue including terephthalic acid and a diol component residue including dianhydrohexitol, based on the total weight of the resin composition; an amount of about 10 to 20 wt % of at least one copolymer selected from a group consisting of unsaturated nitrile-diene-based rubber-aromatic vinyl grafted copolymers and alkylmethacrylate-diene-based rubber-aromatic vinyl grafted copolymers, based on the total weight of the resin composition; and an amount of about 40 to 50 wt % of polycarbonate, based on the total weight of the resin composition. The resin composition may be further added with an amount of about 0.1 to 0.5 parts by weight of a phosphate-based antioxidant based on 100 parts by weight of the resin composition.

Hereinafter, the resin composition for forming a steering wheel remote control bezel according to an exemplary embodiment of the present invention will be described in detail.

In an exemplary embodiment, the resin composition for forming a steering wheel remote control bezel may include: an amount of about 40 to 50 wt % of the polyester copolymer including the dicarboxylic acid component residue including terephthalic acid and the diol component residue including dianhydrohexitol, based on the total weight of the resin composition; an amount of about 10 to 20 wt % of at least one copolymer selected from the group consisting of unsaturated nitrile-diene-based rubber-aromatic vinyl grafted copolymers and alkylmethacrylate-diene-based rubber-aromatic vinyl grafted copolymers, based on the total weight of the resin composition; and an amount of about 40 to 50 wt % of polycarbonate, based on the total weight of the resin composition. The resin composition may be further added with an amount of about 0.1 to 0.5 parts by weight of the phosphate-based antioxidant based on 100 parts by weight of the resin composition.

In the related arts, a polycarbonate/acrylonitrile-butadiene-styrene blend resin may be used, since it has excellent mechanical properties. However, the polycarbonate/acrylonitrile-butadiene-styrene blend resin may have inferior chemical resistance, particularly against the polyurethane foam. For instance, chemical cracks, or the like, may be generated at a contact site with the polyurethane foam. As such, the polycarbonate/acrylonitrile-butadiene-styrene blend resin may not be suitable for being applied to a steering wheel remote control bezel among vehicle interior materials.

The present inventors confirmed through an experiment that when a resin composition including a specific polyester copolymer, at least one copolymer selected from a group consisting of unsaturated nitrile-diene-based rubber-aromatic vinyl grafted copolymers and alkylmethacrylate-diene-based rubber-aromatic vinyl grafted copolymers, and polycarbonate was used, environmental stress crack resistance against the polyurethane foam was improved and the resin composition had sufficient physical properties such as heat resistance or impact resistance to be applied as the vehicle interior material.

In a process of preparing the resin composition, a general used method and apparatus to prepare a blend or mixture of a polymer resin known in the arts may be used without particular limitations. For example, the resin composition may be prepared by putting the polyester copolymer, at least one copolymer selected from the group consisting of unsaturated nitrile-diene-based rubber-aromatic vinyl grafted copolymers and alkylmethacrylate-diene-based rubber-aromatic vinyl grafted copolymers, and polycarbonate into a general mixer, a tumbler, or the like, and mixing them using a twin screw extruder. During the process of preparing the resin composition, each of the resins may be used in a sufficiently dried state.

The resin composition may include: an amount of about 40 to 50 wt % of the polyester copolymer, an amount of about 10 to 20 wt % of at least one copolymer selected from the group consisting of unsaturated nitrile-diene-based rubber-aromatic vinyl grafted copolymers and alkylmethacrylate-diene-based rubber-aromatic vinyl grafted copolymers, and an amount of about 40 to 50 wt % of polycarbonate, based on the total weight of the resin composition. The resin composition may be further added with an amount of about 0.1 to 0.5 parts by weight of the phosphate-based antioxidant based on 100 parts by weight of the resin composition.

Meanwhile, as used herein, the term 'residue' means a predetermined moiety or unit that is included in a resultant of a chemical reaction when a specific compound participates in the chemical reaction, and derived from the specific compound. For example, the 'dicarboxylic acid component residue' and the 'diol component residue' mean moieties derived from a dicarboxylic acid component and a diol component in polyester formed by an esterification reaction or a poly-condensation reaction, respectively.

The 'dicarboxylic acid component' is used to mean a component that includes a dicarboxylic acid such as terephthalic acid, or the like, an alkyl ester (lower alkyl ester having 1 to 4 carbon atoms such as monomethyl ester, monoethyl ester, dimethyl ester, diethyl ester, dibutyl ester, or the like) thereof, and/or an acid anhydride thereof, and may react with the diol component to form a dicarboxylic acid moiety such as a terephthaloyl moiety, or the like.

As the dicarboxylic acid component used to synthesize the polyester includes terephthalic acid, physical properties such as heat resistance, chemical resistance, weather resistance, or the like, of the prepared polyester resin may be improved. For example, a molecular weight decrease phenomenon by UV or a yellowing phenomenon may be prevented due to improved weather resistance.

The dicarboxylic acid component may further include an aromatic dicarboxylic acid component, an aliphatic dicarboxylic acid component, or a mixture thereof as other dicarboxylic acid components. In this case, 'other dicarboxylic acid components' mean the remaining components except for terephthalic acid among the dicarboxylic acid components.

Meanwhile, the dicarboxylic acid component in the polyester copolymer may further include at least one selected from a group consisting of aromatic dicarboxylic acids having 8 to 20 carbon atoms and aliphatic dicarboxylic acids having 4 to 20 carbon atoms.

The aromatic dicarboxylic acid component may be an aromatic dicarboxylic acid having 8 to 20 carbon atoms, particularly having 8 to 14 carbon atoms, or a mixture thereof. A specific example of the aromatic dicarboxylic acid may include a naphthalene dicarboxylic acid such as isophthalic acid, 2,6-naphthalene dicarboxylic acid, or the like, diphenyl dicarboxylic acid, 4,4'-stilbene dicarboxylic acid, 2,5-furandicarboxylic acid, 2,5-thiophene dicarboxylic acid, or the like, but is not limited thereto.

The aliphatic dicarboxylic acid component may be an aliphatic dicarboxylic acid component having 4 to 20 carbon atoms, particularly having 4 to 12 carbon atoms, or a mixture thereof. An example of the aliphatic dicarboxylic acid component may include a linear, branched, or cyclic aliphatic dicarboxylic acid component. For example, the aliphatic dicarboxylic acid may be cyclohexane dicarboxylic acid such as 1,4-cyclohexane dicarboxylic acid, 1,3-cyclohexane dicarboxylic acid, or the like, phthalic acid, sebasic acid, succinic acid, isodecylsuccinic acid, maleic acid, fumaric acid, adipic acid, glutaric acid, azelaic acid, or the like, but a specific example of the aliphatic dicarboxylic acid is not limited thereto.

Meanwhile, the dicarboxylic acid component may include an amount of about 50 to 100 mol %, particularly 70 to 100 mol % of terephthalic acid; and an amount of about 0 to 50 mol %, particularly 0 to 30 mol % of at least one dicarboxylic acid selected from the group consisting of the aromatic aliphatic dicarboxylic acids and the aliphatic dicarboxylic acids, based on a content of the entire dicarboxylic acid component. When a content of terephthalic acid in the dicarboxylic acid component is not in the above mentioned range, the physical properties such as heat resistance, chemical resistance, weather resistance, or the like of the polyester resin may be deteriorated.

Meanwhile, the diol component used to synthesize the polyester may include: an amount of about 5 to 60 mol % of dianhydrohexitol based on a content of the entire diol component; an amount of about 5 to 80 mol % of cyclohexanedimethanol based on a content of the entire diol component; and the remainder of other diol components.

In particular, when the diol component includes isosorbide (1,4:3,6-dianhydroglucitol) as a dianhydrohexitol, the physical properties such as chemical resistance, drug resistance, and the like, of the prepared polyester resin as well as heat resistance thereof may be improved. In addition, as a content of the cyclohexanedimethanol (for example, 1,2-cyclohexanedimethanol, 1,3-cyclohexanedimethanol, or 1,4-cyclohexanedimethanol) is increased in the diol component, impact resistance strength of the prepared polyester resin may be significantly increased.

Further, the diol component may include other diol components in addition to the isosorbide and cyclohexanedimethanol. The 'other diol components' mean diol components except for the isosorbide and cyclohexanedimethanol, and may be, for example, an aliphatic diol, an aromatic diol, or a mixture thereof.

In the polyester copolymer, the diol component may further include at least one selected from a group consisting of compounds represented by the following Chemical Formulas 1 to 3.

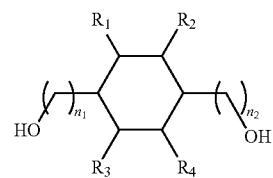

[Chemical Formula 1]

Here, $R_1$ to $R_4$ are each independently hydrogen or a substituted or unsubstituted alkyl group having 1 to 5 carbon atoms, and $n_1$ and $n_2$ are each independently integers of 0 to 3.

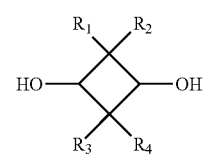

[Chemical Formula 2]

Here, $R_1$ to $R_4$ are each independently hydrogen or a substituted or unsubstituted alkyl group having 1 to 5 carbon atoms.

[Chemical Formula 3]

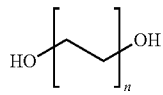

Here, n is an integer of 1 to 7.

As described above, the diol component of the polyester resin may include: an amount of about 5 to 60 mol % of dianhydrohexitol based on a content of the entire diol component. When a content of dianhydrohexitol in the diol component is less than about 5 mol %, heat resistance or chemical resistance of the prepared polyester resin may be insufficient, and a melting viscosity property of the above-mentioned polyester resin may not be obtained. Further, when the content of dianhydrohexitol in the diol component is greater than 60 mol %, an appearance property of the polyester resin or product may be deteriorated, or the yellowing phenomenon may occur.

In addition, the polyester copolymer may have a weight average molecular weight of about 50,000 to 60,000 and a glass transition temperature of about 105 to 125° C.

Meanwhile, the polyester resin may be provided by a preparation method of a polyester resin including: performing an esterification reaction of a diol component that includes an amount of about 5 to 60 mol % of isosorbide as a dianhydrohexitol based on a content of the entire diol component, an amount of about 5 to 80 mol % of cyclohexanedimethanol based on a content of the entire diol component, and the remainder of other diol components and a dicarboxylic acid component including terephthalic acid; adding a phosphorus-based stabilizer when a progress rate of the esterification reaction is 80% or greater; and poly-condensing an esterification reaction product.

When an esterification reaction catalyst including a zinc-based compound is used, the phosphorus base stabilizer is added into a reaction solution at an end stage of the esterification reaction, for example, when the progress rate of the reaction is 80% or greater, and a resultant of the esterification reaction is poly-condensed according to the preparation method of a polyester resin as described above, the polyester resin having physical properties such as high heat resistance, a flame retardant property, impact resistance, and the like, an excellent appearance property, high transparency, and excellent formability may be obtained.

Detailed contents of the dicarboxylic acid component including terephthalic acid, cyclohexanedimethanol, isosorbide, and other diol components are as described above.

The esterification reaction may be performed by reacting the dicarboxylic acid component and the diol component at a pressure of about 10.0 kg/cm$^2$ and a temperature of about 150 to 300° C. Esterification reaction conditions may be suitably adjusted according to specific characteristics of a polyester to be prepared, a molar ratio of the dicarboxylic acid component and glycol, a process condition, or the like. As of the esterification reaction condition, a reaction pressure may be of about 0 to 5.0 kg/cm$^2$, or particularly about 0.1 to 3.0 kg/cm$^2$, and a reaction temperature may be of about 200 to 270° C., or particularly about 240 to 260° C.

In addition, the esterification reaction may be performed by a batch method or continuous method, and each of the raw materials may be separately injected, but the raw materials may be injected in a slurry form in which the carboxylic acid component is mixed with the diol component. Further, the diol component such as dianhydrohexitol and the like, which is a solid at room temperature, may be dissolved in water or ethylene glycol and then mixed with the dicarboxylic acid component such as terephthalic acid and the like, thereby preparing a slurry. Alternatively, after dianhydrohexitol is melted at a temperature of about 60° C. or greater, the dicarboxylic acid component such as terephthalic acid and the like and other diol components may be mixed, thereby preparing a slurry. In addition, water may be additionally injected into the slurry in which the dicarboxylic acid component and a copolymerized diol component of dianhydrohexitol, ethylene glycol, and the like are mixed, thereby promoting improvement of flowability of the slurry.

A molar ratio of the dicarboxylic acid component and the diol component that participate in the esterification reaction may be from about 1:1.05 to about 1:3.0. When the molar ratio of the dicarboxylic acid component and the diol component is less than about 1:1.05, at the time of a polymerization reaction, an unreacted dicarboxylic acid component may remain such that transparency of the resin may be deteriorated. When the molar ratio of the dicarboxylic acid component and the diol component is greater than about 1:3.0, a polymerization reaction rate may be reduced, or productivity of the resin may be deteriorated.

The poly-condensing of the esterification reaction product may include reacting the esterification reaction product of the dicarboxylic acid component and the diol component at a temperature of about 150 to 300° C. and a reduced pressure of about 600 to 0.1 mmHg for about 1 to 24 hours.

This poly-condensation reaction may be performed at a reaction temperature of about 150 to 300° C., of about 200 to 290° C., or particularly of about 260 to 280° C., and at a reduced pressure of about 600 to 0.01 mmHg, of about 200 to 0.05 mmHg, or particularly of about 100 to 0.1 mmHg. As the reduced pressure condition of the poly-condensation reaction is applied, glycol, which is a by-product of the poly-condensation reaction, may be removed to the outside of the reaction system. Accordingly, when the reaction pressure of the poly-condensation reaction is out of the reduced pressure condition range of about 400 to 0.01 mmHg, the by-product may be insufficiently removed.

Further, when a temperature of the poly-condensation reaction is out of a above mentioned temperature range of about 150 to 300° C., or when the poly-condensation reaction is performed at a temperature less than about 150° C., glycol, which is the by-product of the poly-condensation reaction, may not be effectively removed to the outside of the system, such that an inherent viscosity of a final reaction product may be low, thereby deteriorating physical properties of the prepared polyester resin. When the poly-condensation reaction is performed at a temperature greater than about 300° C., appearance of the prepared polyester resin may be yellowed. In addition, the poly-condensation reaction may be performed for a time required until the final reaction product has a suitable inherent viscosity, for example, a mean residence time of about 1 to 24 hours.

The preparation method of a polyester resin composition may further include adding a poly-condensation catalyst. This poly-condensation catalyst may be added to the product of the esterification reaction or a trans-esterification reaction before starting the poly-condensation reaction, added to the mixed slurry including the diol component and the dicarboxylic acid component before the esterification reaction, or added during the esterification reaction, without limitation.

As the poly-condensation catalyst, a titanium-based compound, a germanium-based compound, an antimony-based compound, an aluminum-based compound, a tin-based compound, or a mixture thereof may be used, but not limited thereto.

The resin composition according to the present invention may be at least one copolymer selected from a group consisting of unsaturated nitrile-diene-based rubber-aromatic vinyl grafted copolymers and alkylmethacrylate-diene-based rubber-aromatic vinyl grafted copolymers.

The unsaturated nitrile-diene-based rubber-aromatic vinyl grafted copolymer may have a core-shell rubber form, an average particle diameter of about 0.1 to 0.4 µm, a degree of grafteding of about 5 to 90%, a core glass transition temperature of about −20° C. or less, and a shell glass transition temperature of about 20° C. or greater.

Further, in the unsaturated nitrile-diene-based rubber-aromatic vinyl grafted copolymer, the unsaturated nitrile may be at least one selected from a group consisting of acrylonitrile, methacrylonitrile, ethacrylonitrile, phenylacrylonitrile, and α-chloroacrylonitrile.

In addition, in the grafted copolymers, the diene-based rubber may be a butadiene type of rubber or an isoprene type of rubber.

The alkylmethacrylate-diene-based rubber-aromatic vinyl grafted copolymer may have a core-shell rubber form, an average particle diameter of about 0.1 to 0.3 µm, a degree of grafteding of about 5 to 90%, and the core has a glass transition temperature of about −20° C. or less, and the shell has a glass transition temperature of about 20° C. or greater.

In addition, the alkylmethacrylate may be at least one selected from a group consisting of methylmethacrylate, ethylmethacrylate, propylmethacrylate, isopropylmethacrylate, and butylmethacrylate.

Particularly, the unsaturated nitrile-diene-based rubber-aromatic vinyl grafted copolymer may be an acrylonitrile-butadiene-styrene grafted copolymer, and the alkylmethacrylate-diene-based rubber-aromatic vinyl grafted copolymer may be a methylmethacrylate-butadiene-styrene grafted copolymer.

The polycarbonate may have a glass transition temperature of about 130 to 160° C. and a weight average molecular weight of about 20,000 to 60,000.

In addition, the resin composition may further include at least one selected from a group consisting of unsaturated nitrile-aromatic vinyl-glycidyl methacrylate-based compatibilizers and unsaturated nitrile-aromatic vinyl-maleic anhydride-based compatibilizers.

The unsaturated nitrile-aromatic vinyl-glycidyl methacrylate-based compatibilizer may have a glass transition temperature of about 20 to 200° C. and a weight average molecular weight of about 200 to 300,000.

The unsaturated nitrile-aromatic vinyl-maleic anhydride-based compatibilizer may have a glass transition temperature of about 20 to 200° C. and a weight average molecular weight of about 200 to 300,000.

The resin composition may further include at least one additive selected from a group consisting of an antioxidant, a lubricant, and an anti-hydrolysis agent at a content of about 10 wt % or less, based on the total weight of a basic resin that may include: the polyester copolymer including the dicarboxylic acid component residue including terephthalic acid and the diol component residue including dianhydrohexitol; at least one copolymer selected from the group consisting of the unsaturated nitrile-diene-based rubber-aromatic vinyl grafted copolymers and the alkylmethacrylate-diene-based rubber-aromatic vinyl grafted copolymers; and polycarbonate.

In addition, among the antioxidants, a hindered phenol-based antioxidant may have a weight average molecular weight of about 50 to 300,000.

Further, among the antioxidants, a phosphate-based secondary antioxidant may be used in order to improve long-term heat stability or reliability at the time of performing a heat-resistance cycle test [3 cycle (heat resistance+cold resistance+moisture resistance: 1 cycle)] and a high temperature and high humidity test (85° C.×85% RH×168 h). The phosphate-based secondary antioxidant may have a structure of the following Chemical Formula 4.

[Chemical Formula 4]

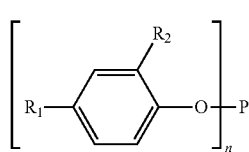

In Chemical Formula 4, $R_1$ and $R_2$ are each independently a substituted or unsubstituted alkyl group having 1 to 40 carbon atoms or a substituted or unsubstituted aryl group having 6 to 40 carbon atoms. In addition, n is an integer of 1 or greater and n may indicate the repetition number of substituted repeating unit.

The lubricant may be at least one selected from a group consisting of a metal stearate-based lubricant, an amide-based lubricant, a paraffin-based lubricant, and an ester-based lubricant.

Hereinafter, various examples of the present invention will be described in detail. However, these examples are only to illustrate the present invention and are not to be construed as limiting the scope of the present invention.

Example 1

Based on 100 parts by weight of a resin consisting of an amount of about 40 wt % of a terephthalic acid-isosorbide-1,4-cyclohexanediol-ethylene glycol copolymer polyester (Tg: about 120° C., weight average molecular weight: about 50,000), an amount of about 10 wt % of an acrylonitrile-butadiene-styrene grafted copolymer, and an amount of about 50 wt % of polycarbonate, an amount of about 3 parts by weight of acrylonitrile-styrene-glycidyl methacrylate, an amount of about 0.2 parts by weight of a phenol-based primary antioxidant, and an amount of about 0.2 parts by weight of a phosphate-based secondary antioxidant were added, uniformly kneaded, and extruded using a twin screw extruder (Φ: 40 mm, L/D=40), thereby preparing pellets.

Here, ECOZEN (SK Chemicals, Korea), which is a high-impact eco-friendly resin, was used as the terephthalic acid-isosorbide-1,4-cyclohexanediol-ethylene glycol copolymer polyester; HR-181 (Kumho Petrochemical, Korea), which is a core-shell rubber type of grafted ABS product, was used as the acrylonitrile-butadiene-styrene grafted copolymer; 3022PJ (Samyang, Korea) was used as the polycarbonate; SAG-001 (SUNNY FC, China) was used as the acrylonitrile-styrene-glycidyl methacrylate; AO-60 (Adeka, Japan) was used as the phenol-based primary antioxidant; and I-168 (Adeka, Japan) was used as the phosphate-based secondary antioxidant.

Example 2

Based on 100 parts by weight of a resin consisting of an amount of about 43 wt % of a terephthalic acid-isosorbide-1,4-cyclohexanediol-ethylene glycol copolymer polyester (Tg: about 120° C., weight average molecular weight: about 50,000), an amount of about 10 wt % of an acrylonitrile-butadiene-styrene grafted copolymer, and an amount of about 47 wt % of polycarbonate, an amount of about 3 parts by weight of acrylonitrile-styrene-glycidyl methacrylate, an amount of about 0.2 parts by weight of a phenol-based primary antioxidant, and an amount of about 0.2 parts by weight of a phosphate-based secondary antioxidant were added, uniformly kneaded, and extruded using a twin screw extruder (Φ: 40 mm, L/D=40), thereby preparing pellets.

Here, ECOZEN (SK Chemicals, Korea), which is a high-impact eco-friendly resin, was used as the terephthalic acid-isosorbide-1,4-cyclohexanediol-ethylene glycol copolymer polyester; HR-181 (Kumho Petrochemical, Korea), which is a core-shell rubber type of grafted ABS product, was used as the acrylonitrile-butadiene-styrene grafted copolymer; 3022PJ (Samyang, Korea) was used as the polycarbonate; SAG-001 (SUNNY FC, China) was used as the acrylonitrile-styrene-glycidyl methacrylate; AO-60 (Adeka, Japan) was used as the phenol-based primary antioxidant; and I-168 (Adeka, Japan) was used as the phosphate-based secondary antioxidant.

Example 3

Based on 100 parts by weight of a resin consisting an amount of about 45 wt % of a terephthalic acid-isosorbide-1,4-cyclohexanediol-ethylene glycol copolymer polyester (Tg: about 120° C., weight average molecular weight: about 50,000), an amount of about 15 wt % of an acrylonitrile-butadiene-styrene grafted copolymer, and an amount of about 40 wt % of polycarbonate, an amount of about 3 parts by weight of acrylonitrile-styrene-glycidyl methacrylate, an amount of about 0.2 parts by weight of a phenol-based primary antioxidant, and an amount of about 0.2 parts by weight of a phosphate-based secondary antioxidant were added, uniformly kneaded, and extruded using a twin screw extruder (Φ: 40 mm, L/D=40), thereby preparing pellets.

Here, ECOZEN (SK Chemicals, Korea), which is a high-impact eco-friendly resin, was used as the terephthalic acid-isosorbide-1,4-cyclohexanediol-ethylene glycol copolymer polyester; HR-181 (Kumho Petrochemical, Korea), which is a core-shell rubber type of grafted ABS product, was used as the acrylonitrile-butadiene-styrene grafted copolymer; 3022PJ (Samyang, Korea) was used as the polycarbonate; SAG-001 (SUNNY FC, China) was used as the acrylonitrile-styrene-glycidyl methacrylate; AO-60 (Adeka, Japan) was used as the phenol-based primary antioxidant, and I-168 (Adeka, Japan) was used as the phosphate-based secondary antioxidant.

Example 4

Based on 100 parts by weight of a resin consisting of an amount of about 40 wt % of a terephthalic acid-isosorbide-1,4-cyclohexanediol-ethylene glycol copolymer polyester (Tg: about 120° C., weight average molecular weight: about 50,000), an amount of about 16 wt % of an acrylonitrile-butadiene-styrene grafted copolymer, an amount of about 2 wt % of a methylmethacrylate-butadiene-styrene grafted copolymer, and an amount of about 42 wt % of polycarbonate, an amount of about 3 parts by weight of acrylonitrile-styrene-glycidyl methacrylate, an amount of about 0.2 parts by weight of a phenol-based primary antioxidant, and an amount of about 0.2 parts by weight of a phosphate-based secondary antioxidant were added, uniformly kneaded, and extruded using a twin screw extruder (Φ: 40 mm, L/D=40), thereby preparing pellets.

Here, ECOZEN (SK Chemicals, Korea), which is a high-impact eco-friendly resin, was used as the terephthalic acid-isosorbide-1,4-cyclohexanediol-ethylene glycol copolymer polyester; HR-181 (Kumho Petrochemical, Korea), which is a core-shell rubber type of grafted ABS product, was used as the acrylonitrile-butadiene-styrene grafted copolymer; M-511 (KANEKA, Japan), which is a core-shell rubber type of grafted MBS product, was used as the methylmethacrylate-butadiene-styrene grafted copolymer; 3025PJ (Samyang, Korea) was used as the polycarbonate, SAG-001 (SUNNY FC, China) was used as the acrylonitrile-styrene-glycidyl methacrylate; AO-60 (Adeka, Japan) was used as the phenol-based primary antioxidant; and I-168 (Adeka, Japan) was used as the phosphate-based secondary antioxidant.

Example 5

Based on 100 parts by weight of a resin consisting of an amount of about 43 wt % of a terephthalic acid-isosorbide-1,4-cyclohexanediol-ethylene glycol copolymer polyester (Tg: about 120° C., weight average molecular weight: about 50,000), an amount of about 10 wt % of an acrylonitrile-butadiene-styrene grafted copolymer, an amount of about 5 wt % of a methylmethacrylate-butadiene-styrene grafted copolymer, and an amount of about 42 wt % of polycarbonate, an amount of about 3 parts by weight of acrylonitrile-styrene-glycidyl methacrylate, an amount of about 0.2 parts by weight of a phenol-based primary antioxidant, and an amount of about 0.2 parts by weight of a phosphate-based secondary antioxidant were added, uniformly kneaded, and extruded using a twin screw extruder (Φ: 40 mm, L/D=40), thereby preparing pellets.

Here, ECOZEN (SK Chemicals, Korea), which is a high-impact eco-friendly resin, was used as the terephthalic acid-isosorbide-1,4-cyclohexanediol-ethylene glycol copolymer polyester; HR-181 (Kumho Petrochemical, Korea), which is a core-shell rubber type of grafted ABS product, was used as the acrylonitrile-butadiene-styrene grafted copolymer; M-511 (KANEKA, Japan), which is a core-shell rubber type of grafted MBS product, was used as the methylmethacrylate-butadiene-styrene grafted copolymer; 3025PJ (Samyang, Korea) was used as the polycarbonate; SAG-001 (SUNNY FC, China) was used as the acrylonitrile-styrene-glycidyl methacrylate; AO-60 (Adeka, Japan) was used as the phenol-based primary antioxidant; and I-168 product (Adeka, Japan) was used as the phosphate-based secondary antioxidant.

Comparative Example 1

Based on 100 parts by weight of a resin composed of an amount of about 20 wt % of an acrylonitrile-butadiene-styrene grafted copolymer, an amount of about 70 wt % of low-viscosity polycarbonate, and an amount of about 10 wt % of an acrylonitrile-styrene copolymer, an amount of about 0.3 parts by weight of a phenol-based primary antioxidant was added, uniformly kneaded, and extruded using a twin screw extruder (Φ: 40 mm, L/D=40), thereby preparing pellets.

Comparative Example 2

Based on 100 parts by weight of a resin consisting of an amount of about 20 wt % of an acrylonitrile-butadiene-styrene grafted copolymer, an amount of about 70 wt % of middle-viscosity polycarbonate, and an amount of about 10 wt % of an acrylonitrile-styrene copolymer, an amount of about 0.3 parts by weight of a phenol-based primary antioxidant was added, uniformly kneaded, and extruded using a twin screw extruder (Φ: 40 mm, L/D=40), thereby prepared pellets.

Comparative Example 3

Based on 100 parts by weight of a resin consisting of an amount of about 20 wt % of an acrylonitrile-butadiene-styrene grafted copolymer, an amount of about 70 wt % of high-viscosity polycarbonate, and an amount of about 10 wt % of an acrylonitrile-styrene copolymer, an amount of about 0.3 parts by weight of a phenol-based primary antioxidant was added, uniformly kneaded, and extruded using a twin screw extruder (Φ: 40 mm, L/D=40), thereby prepared pellets.

After the pellets prepared in Examples 1 to 5 and Comparative Examples 1 to 3 were each equally injection-molded at an injection temperature of about 250° C. using an injection molding device, a state of the injection-molded specimens was adjusted at about 23±2° C. and a relative humidity of about 50±5%, and mechanical properties thereof were measured as in Experimental Examples 1 to 4. The results as shown in the following Tables 1 and 2.

Experimental Example 1: Measurement of Impact Strength

Test specimens were prepared according to ASTM D 256, and impact strength values thereof were measured using an izod impact tester (Toyoseiki).

Experimental Example 2: Measurement of Tensile Properties

Test specimens were prepared according to ASTM D 638, and tensile strength and elongation thereof were measured using a universal testing machine (Zwick Roell Z010).

Experimental Example 3: Measurement of Flexural Properties

Test specimens were prepared according to ASTM D 790, and flexural strength and flexural modulus thereof were measured using a universal testing machine (Zwick Roell Z010).

Experimental Example 4: Measurement of Heat Resistance

Test specimens were prepared according to ASTM D 648, and heat deflection temperature (HDT) thereof was measured using a heat distortion tester (Toyoseiki).

TABLE 1

| Classification | Unit | Example 1 | Example 2 | Example 3 | Example 4 | Example 5 |
|---|---|---|---|---|---|---|
| Izod Impact Strength (⅛") | J/m | 800 | 780 | 790 | 830 | 810 |
| Izod Impact Strength (¼") | J/m | 610 | 590 | 600 | 650 | 620 |
| Tensile Strength | kg/cm² | 540 | 530 | 530 | 520 | 530 |
| Elongation | % | 115 | 110 | 120 | 115 | 120 |
| Heat Deflection temperature (1.82 MPa) | ° C. | 115 | 113 | 110 | 108 | 111 |
| Flexural Strength | kg/cm² | 840 | 820 | 800 | 810 | 820 |
| Flexural Modulus | kg/cm² | 23,000 | 22,000 | 21,800 | 21,900 | 22,000 |

TABLE 2

| Classification | Unit | Comparative Example 1 | Comparative Example 2 | Comparative Example 3 |
|---|---|---|---|---|
| Izod Impact Strength (⅛") | J/m | 670 | 680 | 700 |
| Izod Impact Strength (¼") | J/m | 500 | 510 | 520 |
| Tensile Strength | kg/cm² | 530 | 540 | 550 |
| Elongation | % | 105 | 100 | 110 |
| Heat Deflection temperature (1.82 MPa) | ° C. | 112 | 113 | 113 |
| Flexural Strength | kg/cm² | 780 | 800 | 810 |
| Flexural Modulus | kg/cm² | 21,000 | 21,500 | 22,000 |

Experimental Example 5: Evaluation of Reliability of Molded Product Prepared from Resin Composition Molding and painting works of the pellets prepared in Examples 1 to 5 and Comparative Examples 1 to 3 were performed at Soonyang Tech Corp (located in Gyeongju, South Korea), which is a Tier 2 component manufacturer of Hyundai Motors, and appearance, paintability, adhesion, scratch resistance, impact resistance, heat resistance, moisture resistance, heat-resistance cycle, abrasion resistance, chemical resistance, sunscreen resistance, light resistance of the molded products were evaluated-based on Material Standard Spec. (MS Spec.) of Hyundai Motors, and a high temperature high humidity test was performed based on Environmental Standard Spec. (ES Spec.) of Hyundai Motors in a Hyundai Motors Technology Research Center. Measurement results are shown in the following Tables 3 and 4.

TABLE 3

| Evaluation Category | Evaluation Method and Condition | Evaluation Result of Examples 1 to 5 |
|---|---|---|
| Material Basic Properties | Method according to MS214-04 Type A | Satisfactory |
| Appearance | Observation of Appearance Defect | Satisfactory |

TABLE 3-continued

| Evaluation Category | Evaluation Method and Condition | Evaluation Result of Examples 1 to 5 |
|---|---|---|
| Paintability | Observation of Appearance Defect | Satisfactory |
| Adhesion | — | Satisfactory |
| Scratch Resistance | Sapphire Test | Satisfactory |
| Impact Resistance | Dropping Weight (12.7 mm, 0.5 kgf) at Height of 20 cm | Satisfactory |
| Test after Adhering Polyurethane Foam (Presence or Absence of Surface Crack) Heat Resistance | 80° C. × 300 h | Satisfactory |
| Moisture Resistance | 50° C. × 98% RH × 168 h | Satisfactory |
| Heat-Resistance Cycle | 3 Cycle (heat resistance + cold resistance + moisture resistance: 1 Cycle) | Satisfactory |
| High Temperature High Humidity test | 85° C. × 85% RH × 168 h | Satisfactory |
| Abrasion Resistance (Plane Abrasion) | Load: 1.0 kgf, Friction velocity: 60 RPM | Satisfactory |
| Chemical Resistance | Gasoline, Engine Oil, Wax, Grease, Washer Solution, Ethyl Alcohol | Satisfactory |
| Sunscreen Resistance | After applying sunscreen (0.25 g), 80° C. × 1 h | Satisfactory |
| Light Resistance | 1050 KJ/m$^2$ at 340 nm | Satisfactory |
| Head Impact Test | Internal Quality Evaluation Method (Hyundai Motors) | Satisfactory |

TABLE 4

| Evaluation Category | Evaluation Method and Condition | Evaluation Result of Comparative Examples 1 to 3 |
|---|---|---|
| Material Basic Properties | Method according to MS214-04 Type A | Satisfactory |
| Appearance | Observation of Appearance Defect | Satisfactory |
| Paintability | Observation of Appearance Defect | Satisfactory |
| Adhesion | — | Satisfactory |
| Scratch Resistance | Sapphire Test | Satisfactory |
| Impact Resistance | Dropping Weight (12.7 mm, 0.5 kgf) at Height of 20 cm | Satisfactory |
| Test after Adhering Polyurethane Foam (Presence or Absence of Surface Crack) Heat Resistance | 80° C. × 300 h | Dissatisfactory |
| Moisture Resistance | 50° C. × 98% RH × 168 h | Dissatisfactory |
| Heat-Resistance Cycle | 3 Cycle (heat resistance + cold resistance + moisture resistance: 1 Cycle) | Dissatisfactory |
| High Temperature High Humidity test | 85° C. × 85% RH × 168 h | Dissatisfactory |
| Abrasion Resistance (Plane Abrasion) | Load: 1.0 kgf, Friction Velocity: 60 RPM | Satisfactory |
| Chemical Resistance | Gasoline, Engine Oil, Wax, Grease, Washer Solution, Ethyl Alcohol | Satisfactory |
| Sunscreen Resistance | After applying sunscreen (0.25 g), 80° C. × 1 h | Satisfactory |
| Light Resistance | 1050 KJ/m$^2$ at 340 nm | Satisfactory |
| Head Impact Test | Internal Quality Evaluation Method (Hyundai Motors) | Satisfactory |

As shown in the above measurement results, for each Example prepared according to an exemplary embodiment of the present invention, environmental stress crack resistance against the polyurethane foam was substantially improved as compared to the Comparative Examples. Further, for each Example, heat resistance or impact resistance was also improved as compared to the Comparative Examples. Therefore, it may be appreciated that among the vehicle interior materials, the resin composition according to the present invention may provide required physical properties such as heat resistance, impact resistance, or the like to be used for a steering wheel remote control bezel and further provide improved environmental stress crack resistance as compared to the PC/ABS resin according to the related art.

What is claimed:
1. A resin composition for forming a steering wheel remote control bezel, the resin composition comprising:
    an amount of 40 to 50 wt % of a polyester copolymer including a dicarboxylic acid component residue including terephthalic acid and a diol component residue including 5 to 60 mol % of dianhydrohexitol, and 5 to 80 mol % of compounds represented by the following Chemical Formulas 1 based on a content of the entire diol component based on the total weight of the resin composition;
    an amount of 10 to 20 wt % of at least one copolymer selected from the group consisting of unsaturated nitrile-diene-based rubber-aromatic vinyl grafted copolymers and alkylmethacrylate-diene-based rubber-aromatic vinyl grafted copolymers, based on the total weight of the resin composition;
    unsaturated nitrile-aromatic vinyl-glycidyl methacrylate compatibilizers; and
    an amount of 40 to 50 wt % of polycarbonate, based on the total weight of the resin composition,
    wherein the unsaturated nitrile-aromatic vinyl-glycidyl methacrylate compatibilizers has a glass transition temperature of 20 to 200° C. and a weight average molecular weight of about 200 to 300,000,
    wherein an amount of 0.1 to 0.5 parts by weight of a phosphite-based antioxidant based on 100 parts by weight of the resin composition is further added to the resin composition:

[Chemical Formula 1]

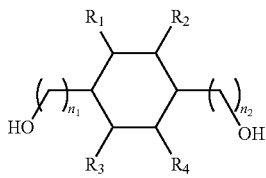

where $R_1$ to $R_4$ are each independently hydrogen or a substituted or unsubstituted alkyl group having 1 to 5 carbon atoms, and $n_1$ and $n_2$ are each independently integers of 0 to 3.

2. The resin composition of claim 1, wherein the polyester copolymer has a weight average molecular weight of 50,000 to 60,000 and a glass transition temperature of 105 to 125° C.

3. The resin composition of claim 1, wherein in the polyester copolymer, the dicarboxylic acid component further includes at least one selected from the group consisting of aromatic dicarboxylic acids having 8 to 20 carbon atoms and aliphatic dicarboxylic acids having 4 to 20 carbon atoms.

4. The resin composition of claim 1, wherein in the polyester copolymer, the dianhydrohexitol is isosorbide.

5. The resin composition of claim 1, wherein in the polyester copolymer, the diol component further includes at least one selected from the group consisting of compounds represented by the following Chemical Formulas 2 to 3:

[Chemical Formula 2]

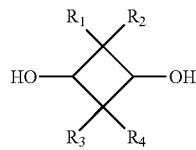

where $R_1$ to $R_4$ are each independently hydrogen or a substituted or unsubstituted alkyl group having 1 to 5 carbon atoms; and

[Chemical Formula 3]

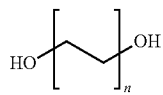

where n is an integer of 1 to 7.

6. The resin composition of claim 1, wherein in the polyester copolymer, the diol component further includes 1,4-cyclohexanediol and ethylene glycol.

7. The resin composition of claim 1, wherein the unsaturated nitrile-diene-based rubber-aromatic vinyl grafted copolymer has a core-shell rubber form, an average particle diameter of 0.1 to 0.4 μm, a degree of grafteding of 5 to 90%, and the core has a glass transition temperature of −20° C. or less, and the shell has a glass transition temperature of 20° C. or greater.

8. The resin composition of claim 1, wherein in the unsaturated nitrile-diene-based rubber-aromatic vinyl grafted copolymer, the unsaturated nitrile is at least one selected from the group consisting of acrylonitrile, methacrylonitrile, ethacrylonitrile, phenylacrylonitrile, and α-chloroacrylonitrile.

9. The resin composition of claim 1, wherein in the grafted copolymer, the diene-based rubber is butadiene type rubber or isoprene type rubber.

10. The resin composition of claim 1, wherein in the grafted copolymer, the aromatic vinyl is at least one selected from the group consisting of styrene, α-methylstyrenevinyltoluene, t-butylstyrene, halogen-substituted styrene, 1,3-dimethylstyrene, 2,4-dimethylstyrene, and ethylstyrene.

11. The resin composition of claim 1, wherein the alkylmethacrylate-diene-based rubber-aromatic vinyl grafted copolymer is a methylmethacrylate-butadiene-styrene grafted copolymer.

12. The resin composition of claim 1, wherein the polycarbonate has a glass transition temperature of 130 to 160° C. and a weight average molecular weight of 20,000 to 60,000.

13. The resin composition of claim 1, wherein the phosphite-based antioxidant is represented by the following Chemical Formula 4:

[Chemical Formula 4]

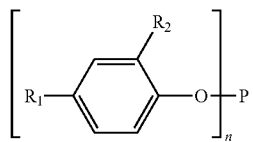

where $R_1$ and $R_2$ are each independently a substituted or unsubstituted alkyl group having 1 to 40 carbon atoms or a substituted or unsubstituted aryl group having 6 to 40 carbon atoms, and n is 3 or 5.

14. The resin composition of claim 1, further comprising at least one additive selected from the group consisting of a lubricant and an anti-hydrolysis agent.

15. The resin composition of claim 1, consisting essentially of:
an amount of 40 to 50 wt % of a polyester copolymer including a dicarboxylic acid component residue including terephthalic acid and a diol component residue including 5 to 60 mol % of dianhydrohexitol, and 5 to 80 mol % of compounds represented by the following Chemical Formulas 1 based on a content of the entire diol component, based on the total weight of the resin composition;
an amount of 10 to 20 wt % of at least one copolymer selected from the group consisting of unsaturated nitrile-diene-based rubber-aromatic vinyl grafted copolymers and alkylmethacrylate-diene-based rubber-aromatic vinyl grafted copolymers, based on the total weight of the resin composition; and
an amount of 40 to 50 wt % of polycarbonate, based on the total weight of the resin composition,
wherein an amount of 0.1 to 0.5 parts by weight of a phosphite-based antioxidant based on 100 parts by weight of the resin composition is further added to the resin composition:

[Chemical Formula 1]

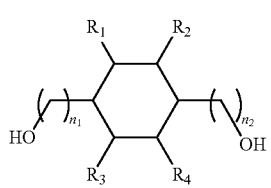

where $R_1$ to $R_4$ are each independently hydrogen or a substituted or unsubstituted alkyl group having 1 to 5 carbon atoms, and $n_1$ and $n_2$ are each independently integers of 0 to 3.

16. A steering wheel remote control bezel of a vehicle that is manufactured from a resin composition of claim 1.

* * * * *